United States Patent
Galmiche

(10) Patent No.: US 11,588,374 B2
(45) Date of Patent: Feb. 21, 2023

(54) MECHANICAL DRIVE SYSTEM AND ASSOCIATED MOTOR COMPRESSOR

(71) Applicant: GE Energy Power Conversion Technology Limited, Warwickshire (GB)

(72) Inventor: Christophe Galmiche, Champigneulles (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 396 days.

(21) Appl. No.: 16/746,792

(22) Filed: Jan. 17, 2020

(65) Prior Publication Data

US 2020/0235637 A1 Jul. 23, 2020

(30) Foreign Application Priority Data

Jan. 18, 2019 (FR) ........................................ 1900469

(51) Int. Cl.
| | |
|---|---|
| *H02K 7/116* | (2006.01) |
| *F04C 23/02* | (2006.01) |
| *H02K 7/00* | (2006.01) |
| *F04B 35/04* | (2006.01) |
| *F16H 57/02* | (2012.01) |

(52) U.S. Cl.
CPC .............. *H02K 7/116* (2013.01); *F04C 23/02* (2013.01); *H02K 7/003* (2013.01); *F04B 35/04* (2013.01); *F04C 2240/40* (2013.01); *F16H 2057/02034* (2013.01)

(58) Field of Classification Search
CPC ........ H02K 7/116; H02K 7/003; H02K 7/083; H02K 7/1163; F04C 23/02; F04C 2240/40; F04B 35/04; F04B 39/00; F16H 2057/02034; F16H 1/222; F16H 1/06; F16H 1/14; F16H 1/22; F16H 57/021; F16H 57/023
USPC ..................................................... 310/83, 89
See application file for complete search history.

(56) References Cited

U.S. PATENT DOCUMENTS

| | | | |
|---|---|---|---|
| 6,211,587 B1 * | 4/2001 | Enomoto ................. | H02K 5/18 310/410 |
| 8,779,645 B2 | 7/2014 | Mao et al. | |
| 9,059,607 B2 * | 6/2015 | Terakado ............... | H02K 7/006 |
| 9,356,485 B2 | 5/2016 | Matsuda | |
| 10,458,237 B2 | 10/2019 | Biro et al. | |

(Continued)

FOREIGN PATENT DOCUMENTS

| | | |
|---|---|---|
| EP | 1111759 A2 | 6/2001 |
| EP | 2811625 A1 | 12/2014 |

(Continued)

OTHER PUBLICATIONS

Preliminary Search Report and Written Opinion of FR Appl. No. 1900469, dated Oct. 16, 2019, 5 pages.

*Primary Examiner* — John K Kim
(74) *Attorney, Agent, or Firm* — Wood IP LLC

(57) ABSTRACT

The mechanical drive system comprises a frame, at least one rotating electric machine comprising an end shaft rotor arranged on the frame, and at least one transfer case having at least one driving gear wheel.

The driving gear wheel is integral with a rotor shaft of the rotating electric machine, the transfer case being arranged on the frame.

15 Claims, 14 Drawing Sheets

(56) References Cited

U.S. PATENT DOCUMENTS

| | | | |
|---|---|---|---|
| 2013/0140477 A1* | 6/2013 | Shimane | H02K 7/116 310/83 |
| 2015/0318812 A1* | 11/2015 | O'Donnell | H02P 5/747 310/78 |
| 2016/0099632 A1 | 4/2016 | Rawlinson | |
| 2016/0190892 A1* | 6/2016 | Johnson | F16H 57/12 310/89 |
| 2017/0114640 A1* | 4/2017 | Biro | F16C 35/067 |
| 2018/0019644 A1* | 1/2018 | Okada | F16H 1/20 |
| 2020/0235637 A1* | 7/2020 | Galmiche | H02K 7/116 |

FOREIGN PATENT DOCUMENTS

| | | |
|---|---|---|
| EP | 296497 A1 | 1/2016 |
| EP | 3357731 A1 | 8/2018 |
| JP | S5718840 A | 1/1982 |
| JP | 2006238590 A | 9/2006 |
| WO | 20160162892 A1 | 10/2016 |
| WO | 20180130420 A1 | 7/2018 |

* cited by examiner

MECHANICAL DRIVE SYSTEM AND ASSOCIATED MOTOR COMPRESSOR

The present invention relates to mechanical drive systems comprising at least one rotating electric machine comprising a rotor without a through shaft.

The present invention also relates to a motor compressor comprising such drive system.

FIG. 1 shows an example of the drive system 1 according to the prior art comprising a rotating electric machine 2 connected to a transfer case 3 by a coupling shaft 4.

The rotating electric machine 2 has a housing 5 and an end shaft rotor 6 so that the peripheral speed of the rotor 6 may be greater than 200 m/s.

The rotor 6 is held in the housing 5 via two bearings 7, and comprises two half-shafts 8 and 9 enclosing a magnetic block 10.

The half-shaft 8 is connected to a first end of the coupling shaft 4 via a first flexible coupling device 4a.

A second flexible coupling device 4b connects the coupling shaft to an input shaft 11 incorporated in a casing 12 of the transfer case 3.

Bearings 13 and 14 hold the input shaft in the casing 12.

A driving gear wheel 15 is mounted on the input shaft 11 between the two bearings 13 and 14, and is meshed with a driven gear wheel 16 mounted on an output shaft 17 of the transfer case 3.

The coupling shaft 4, the flexible coupling devices 4a and 4b, the rotor 6, the bearings 7, 13 and 14, the input shaft 11 and the driven gear wheel 15 form a drive transmission line.

Depending on the diameter of the driving and driven gear wheels, the speed and/or the torque of the output shaft 17 is higher or lower than the speed of the rotor 6.

The system 1 is further configured to transfer a large torque to the output shaft 17.

Since the half-shaft 8 and the input shaft 11 are not at the same temperature during the system 1 operation, the thermal expansions of the half-shaft 8 and of the input shaft 11 cause deformations compensated for by the flexible coupling devices 4a and 4b.

However, the integration of the flexible coupling devices 4a and 4b requires the presence of the coupling shaft 4 and sufficient dimensioning of the bearings 7 and 13 to hold the shaft 4 and the devices 4a and 4b, which increases the mass and the bulk of the system 1, in particular in the axial direction of the drive transmission line.

Additionally, since the devices 4a and 4b are flexible, they dissipate energy and degrade the overall performance of the system 1.

Moreover, since the rotating electric machine 2 and the transfer case 3 are separated by the shaft 4, the devices 4a and 4b further compensate for the coaxiality defects of the half-shaft 8 and the input shaft 11.

Reference may be made to documents U.S. Pat. No. 9,059,607, US2016/099632, JP2006238590, WO2016/162892, US2017/0114640, U.S. Pat. No. 8,779,645 and WO2018/130420 which disclose a rotating electric machine comprising a one piece rotor shaft on which a gear wheel is attached.

However, since the rotor shaft is in one piece, depending on the dimensions of the shaft, in particular its length, it is difficult and expensive to machine, manipulate and transport such a shaft in order to attach thereto a gear wheel, in particular on rotating electric machines of high power exceeding for example 5000 kW.

Moreover, since the shaft is a through shaft, i.e. it passes through the magnetic block of the rotor, the peripheral speed of the rotor is limited to 200 m/s in order to avoid excessive stresses in the holed part of the magnetic block in contact with the through shaft under the effect of the centrifugal force when the rotor is rotating.

Documents EP1111759 and EP2811625 disclose a rotating electric machine comprising a rotor comprising two half-shafts screwed together and passing through a magnetic block. The driving gear wheel is attached to or machined on one of the half-shafts.

However, the rotor shaft on which the gear wheel is attached is hollow, so that the value of the torque transmitted is limited.

Moreover, since the shaft of the machine is a through shaft, the peripheral speed of the hollow rotor is limited to 200 m/s in order to avoid excessive stresses in the hollow magnetic block under the effect of the centrifugal force when the rotor is in rotation.

Reference may further be made to documents EP2964976 and EP1319866 which disclose a transfer case comprising two inputs each connected to a rotor shaft of a different rotating electric machine.

However, since the rotor shafts are through shafts, the peripheral speed of the rotor is also limited to 200 m/s.

It is therefore proposed to overcome all or part of the disadvantages of the mechanical drive systems according to the state of the art, in particular by reducing the mass and the bulk of said systems, by increasing the transmitted torque and the rotational speed of the rotating electric machine incorporated in said systems and by increasing the overall performance and the power of said systems.

In view of the foregoing, a mechanical drive system comprising a frame, at least one rotating electric machine comprising an end shaft rotor arranged on the frame, and at least one transfer case having at least one driving gear wheel is proposed.

The driving gear wheel is integral with a rotor shaft of the rotating electric machine, the transfer case being arranged on the frame.

According to one characteristic, the end shaft rotor has a cylindrical magnetic block enclosed between two half-shafts, the half-shafts forming the rotor shaft.

Preferably, the half-shaft and the driving gear wheel are made in one piece.

Advantageously, the transfer case comprises a casing formed by elements of the frame so that the transfer case is integrated into the frame.

Preferably, the transfer case further comprises at least one driven gear wheel connected to an output shaft of said box, the driven gear wheel being meshed with the driving gear wheel, a plane of the rotation axes of the driving gear wheel and of the driven gear wheel forms an angle with the base of the frame of between 30° and 60°.

Advantageously, the transfer case further comprises at least two driven gear wheels each connected to an output shaft of said box, each of the driven gear wheels being meshed with the driving gear wheel.

According to another characteristic, the mechanical drive system further comprises a second transfer case arranged on the base of the frame, the second end of the rotor having the driving gear wheel of the second transfer case.

According to yet another characteristic, the mechanical drive system comprises a second rotating electric machine comprising an end shaft rotor arranged on the base of the frame, at least one end of a rotor shaft of the second rotating electric machine having a second driving gear wheel of the transfer case.

Preferably, the transfer case further comprises at least one driven gear wheel connected to an output shaft of said box, the driven gear wheel being meshed with the driving gear wheels, a first plane of the rotation axes of the driving gear wheel and of the driven gear wheel and a second plane of the rotation axes of the second driving gear wheel and the driven gear wheel form, respectively, an angle with the base of the frame of between 30° and 60°.

According to another characteristic, the mechanical drive system comprises a second transfer case similar to the first transfer case, the free ends of the half-shafts of the rotors of the rotating electric machines each being provided with a driving gear wheel driving an output shaft of the second transfer case.

Advantageously, the gear wheels are spur gears so as to form parallel gears.

Preferably, the gear wheels are bevel gears so as to form concurrent gears.

According to another characteristic, a rotation axis of each driving gear wheel and a rotation axis of each driven gear wheel are perpendicular.

Preferably, a rotation axis of each driving gear wheel and a rotation axis of each driven gear wheel form an angle of between 5° and 45°, preferably between 10° and 30°.

Advantageously, each rotating electric machine and each transfer case are arranged in a different sealed chamber formed by the frame.

Preferably, the rotating electric machine is of the squirrel cage asynchronous type or with a wound rotor, or of the synchronous type, preferably with a wound rotor.

According to another aspect, a motor compressor comprising a mechanical drive system as defined previously, driving a compression section of the motor compressor is proposed.

Other characteristics and advantages of the invention will emerge on reading the following description of the embodiments of the invention, provided solely by way of non-limiting examples and with reference to the drawings in which:

FIG. 1 which has already been mentioned, shows a mechanical drive system comprising an end shaft rotor rotating electric machine according to the state of the art;

Figure 1:
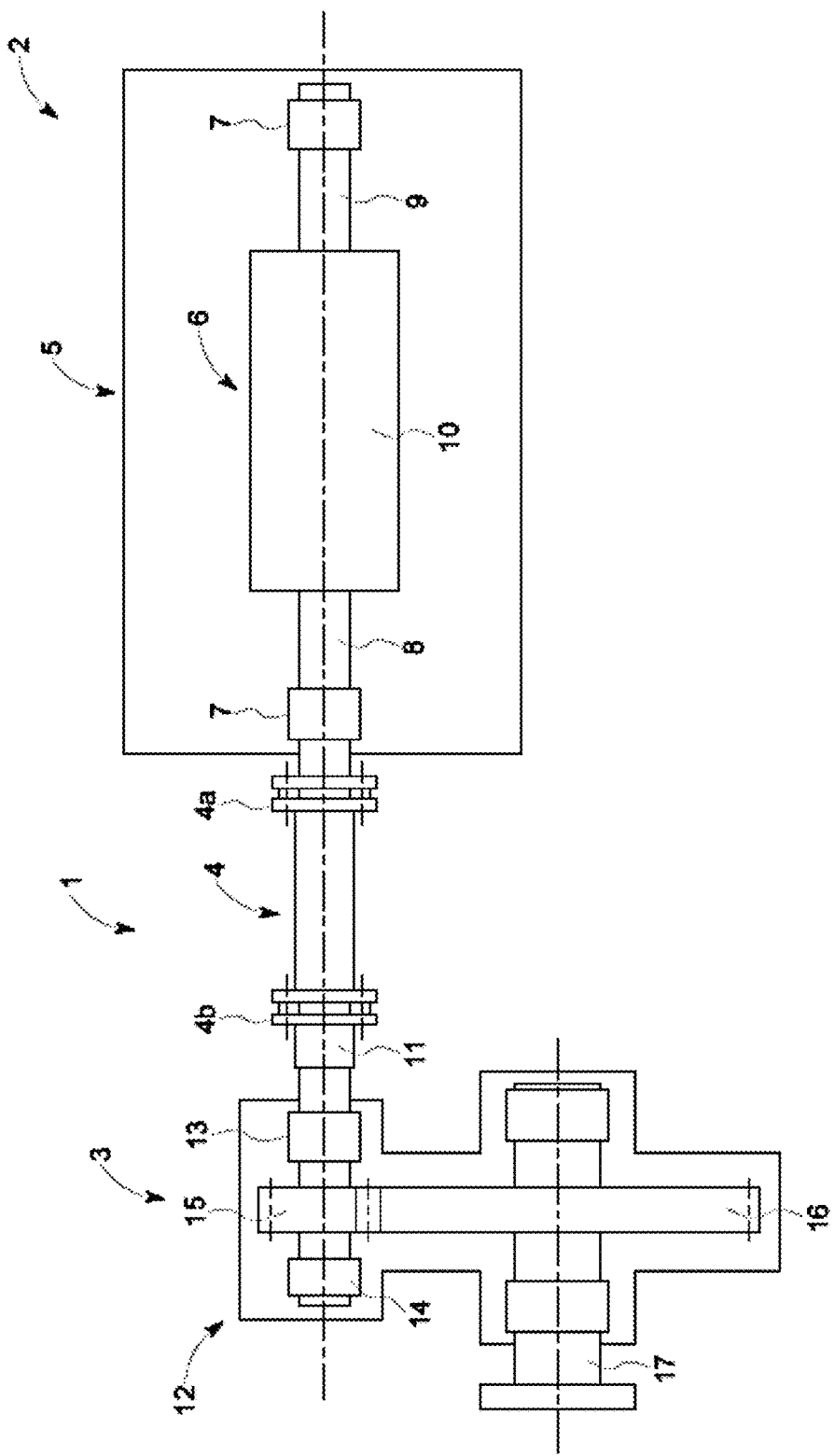
Figure 2:
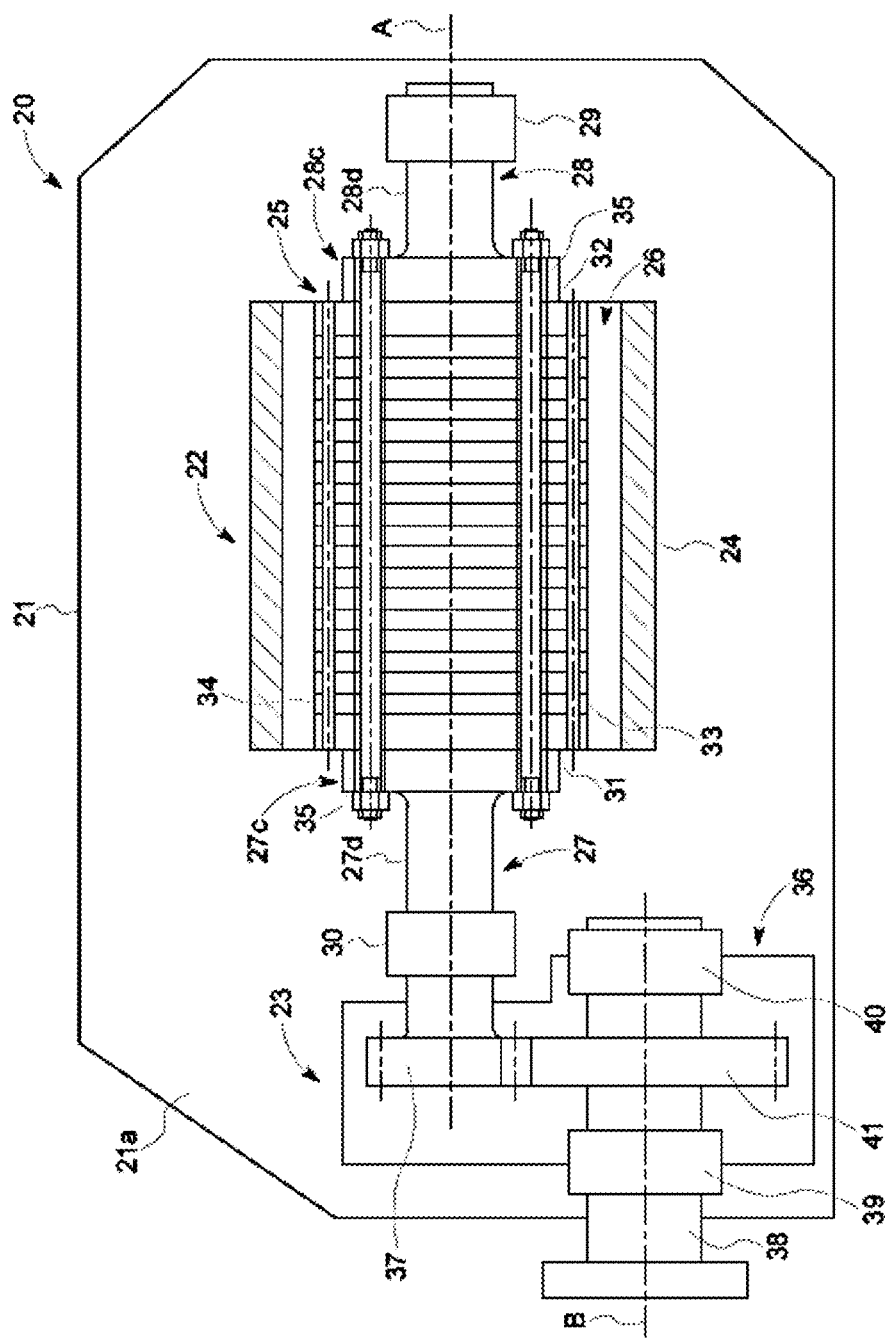
FIG. 2 and FIG. 3 show a partial section and a partial view of a first embodiment of a mechanical drive system according to the invention.
Figure 3:
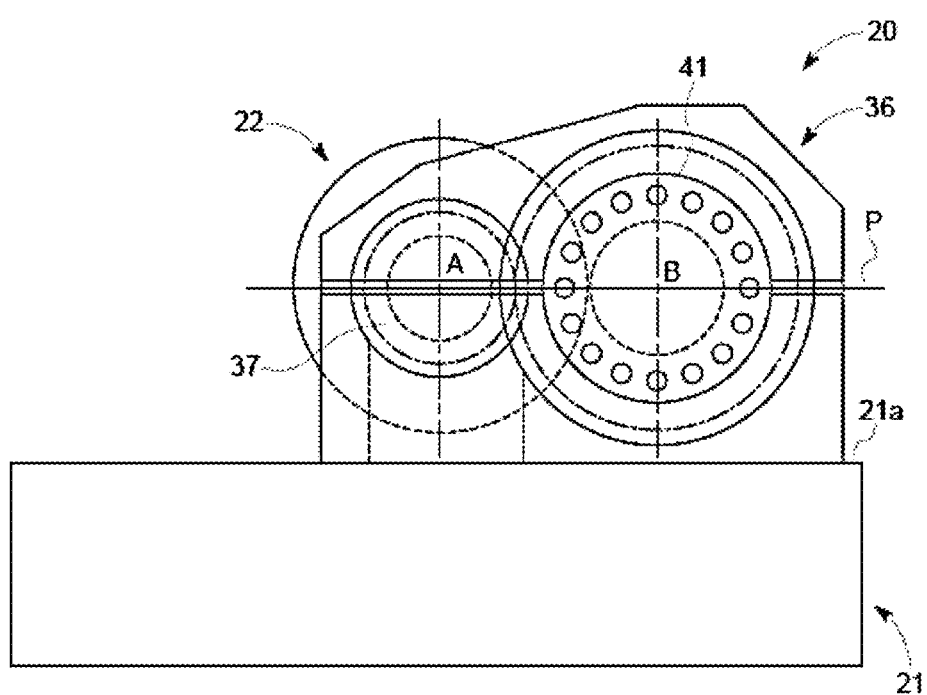

Reference is made to FIGS. 2 and 3 which show a partial section and a partial view of a first embodiment of a mechanical drive system 20 comprising a frame 21, a rotating electric machine 22 and a transfer case 23 arranged on a base 21a of the frame.

The rotating electric machine 22 is of the squirrel cage asynchronous type and comprises a stator 24 in which a rotor 25 is inserted comprising an end shaft with a central axis A.

As a variant, the rotating electric machine 22 can be a machine of the wound rotor asynchronous type or synchronous type, preferably with a wound rotor of which the power supply of the rotor is preferably performed via rings and brushes.

The end shaft rotor 25 comprises a cylindrical magnetic block 26 enclosed by two half-shafts 27 and 28 forming a rotor shaft.

The half-shafts 27 and 28 each comprise a fixing flange 27c and 28c connected to one end of the magnetic block 26 and a transmission shaft 27d and 28d.

The half-shafts 27 and 28 are obtained for example by forging or molding and are for example made from steel.

Each transmission shaft 27d and 28d is supported in rotation by a bearing 29, 30.

The magnetic block 26 comprises two short-circuit discs 31 and 32 enclosing compacted magnetic sheets 33 and conductive bars 34 housed in the magnetic sheets 33 and the short-circuit discs 31 and 32 such that the short-circuit discs 31 and 32 and the conductive bars 34 form a squirrel cage.

The magnetic sheets 33 are preferably less than 2 mm thick, for example 0.65 mm or 0.5 mm.

As a variant, the magnetic block 26 comprises a stack of metal plates, the thickness of the metal plates preferably being greater than 5% of the external diameter of the magnetic block 26.

According to yet another variant, the magnetic block 26 comprises a one-piece steel body.

Tie rods 35 are distributed uniformly over a diameter of the magnetic block 26 so as to keep the magnetic sheets 33 compacted between the half-shafts 27 and 28.

The tie rods 35 pass through smooth holes arranged in the fixing flanges 27c and 28c, and comprise a nut at each end so as to keep the magnetic sheets 33 compacted.

The transfer case 23 has a casing 36 having a driving gear wheel 37 integral with the transmission shaft 27d, an output shaft 38 comprising a central axis B and supported in rotation by bearings 39 and 40, and a driven gear wheel 41 between the two bearings 39 and 40 integral with the output shaft 38.

The axes A and B are arranged in a plane P substantially parallel to the base 21a of the frame.

The driving gear wheel 37 is meshed with the driven gear wheel 41 so that the rotor shaft of the rotating electric machine 22 drives the output shaft 38.

Depending on the ratio of the number of teeth of the driving gear wheels 37 and driven gear wheels 41, the torque and/or the speed of the output shaft 38 are increased or decreased with respect to the torque and speed of the rotor shaft.

Of course, the transfer case 23 may have more than one driven gear wheel and more than one driving gear wheel.

Since the rotating electric machine 22 and the transfer case 23 are arranged on the same frame and the driving gear wheel 37 is integral with the rotor of the rotating electric machine 22, the flexible coupling devices arranged between the electric machine and the transfer case as well as the coupling shaft are eliminated.

Consequently, the number of bearings is decreased, a single bearing 30 being necessary to support in rotation the driving gear wheel 37 and the half-shaft 27 of the rotor 25.

Since the bearings generate losses through friction, the overall performance of the drive transmission line comprising the rotor 25, the bearings 29 and 30, and the driving gear wheel 37 is increased.

Moreover, the elimination of the flexible coupling devices and the reduction in the number of bearings make it possible to reduce the length of the mechanical drive system 20 along the axis A and to reduce the mass of the drive transmission line.

Such a drive transmission line has fewer eigenmodes/critical speeds than a drive transmission line known in the prior art. Furthermore, since the rotor shaft is an end shaft the peripheral speed of the rotor 25 can reach values greater than 200 m/s. The speed range of use of the mechanical drive system 20 is therefore wider than that of a mechanical drive system known in the state of the art.

The half-shaft 27 and the driving gear wheel 37 are made in one piece.

Therefore, the half-shaft 27 and the driving gear wheel 37 can transmit by material continuity a torque of higher value than in the case of a driving gear wheel attached on the half-shaft 27 and integral with the half-shaft for example by interference fit or keying.

The half-shaft 27 and the driving gear wheel 37 are obtained for example by forging or molding, then by machining and are for example made from steel.

Since the half-shaft 27 is less heavy and shorter than a solid rotor or than a shaft passing through the magnetic block of the rotor, the machining of the driving gear wheel 37 in one piece is facilitated, in particular the handling operations of the half-shaft 27 comprising the driving gear wheel 37 before and after the machining operation.

According to another embodiment, when the torque to be transmitted is less than the maximum torque transmissible by a driving gear wheel attached to the half-shaft 27, the driving gear wheel 37 with holes in its center is mounted on the half-shaft 27 for example by interference fit, keying or hydraulic interference fit of the driving gear wheel 37 onto a conical end of the shaft.

However, the rotation speed is lower than in the case of a driving gear wheel integral with the half-shaft so as to limit the concentration of the stresses in the central hole of the attached driving gear wheel generated by the centrifugal force when the rotor is rotating.

Figure 4:
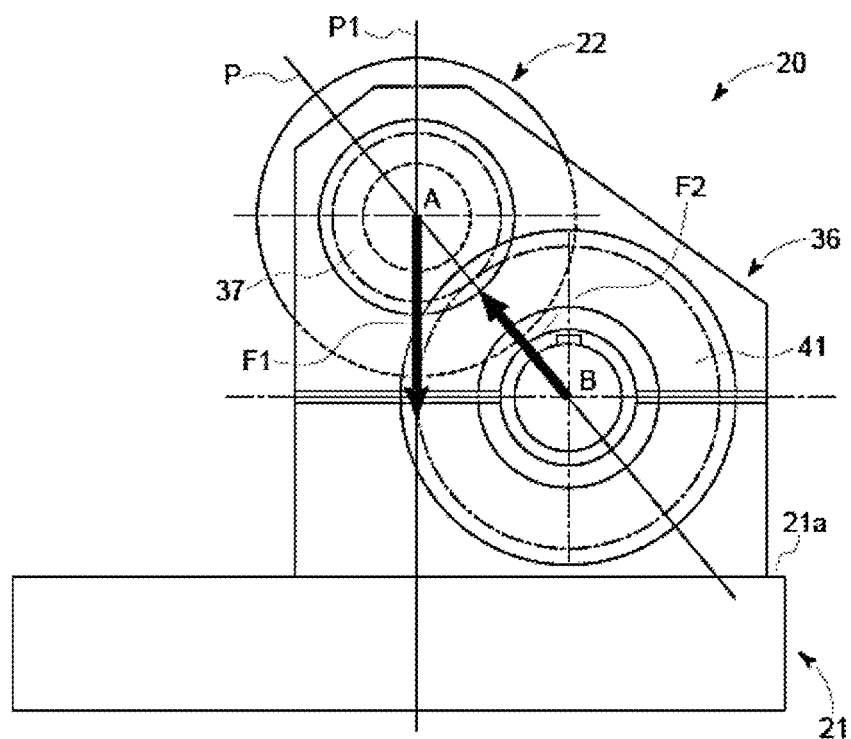
FIG. 4 shows a second embodiment of the mechanical drive system according to the invention.

With reference to FIG. 4 which shows a partial view of a second embodiment of the mechanical drive system 20.

This embodiment of the mechanical drive system 20 differs from the embodiment shown in FIG. 3 in that the plane P of the rotation axes A and B of the driving gear wheel 37 and the driven gear wheel 41 forms an angle with the base 21*a* of the frame 21 of between 30° and 60°.

The resulting forces F1 and F2 on the bearings 30, 39 and 40 have been illustrated respectively in a plane P1 perpendicular to the base 21*a* and in the plane P.

In this configuration of the rotation axes A and B, the component of the forces F1 and F2 being exerted perpendicularly to the base 21*a* are partially compensated reducing the force to which the bearing 30 is subjected.

Since the forces undergone by the bearings are decreased, the bearings can be sized for smaller forces. They may for example be of reduced size, further reducing the overall bulk of the transmission system 20.

Figure 5:
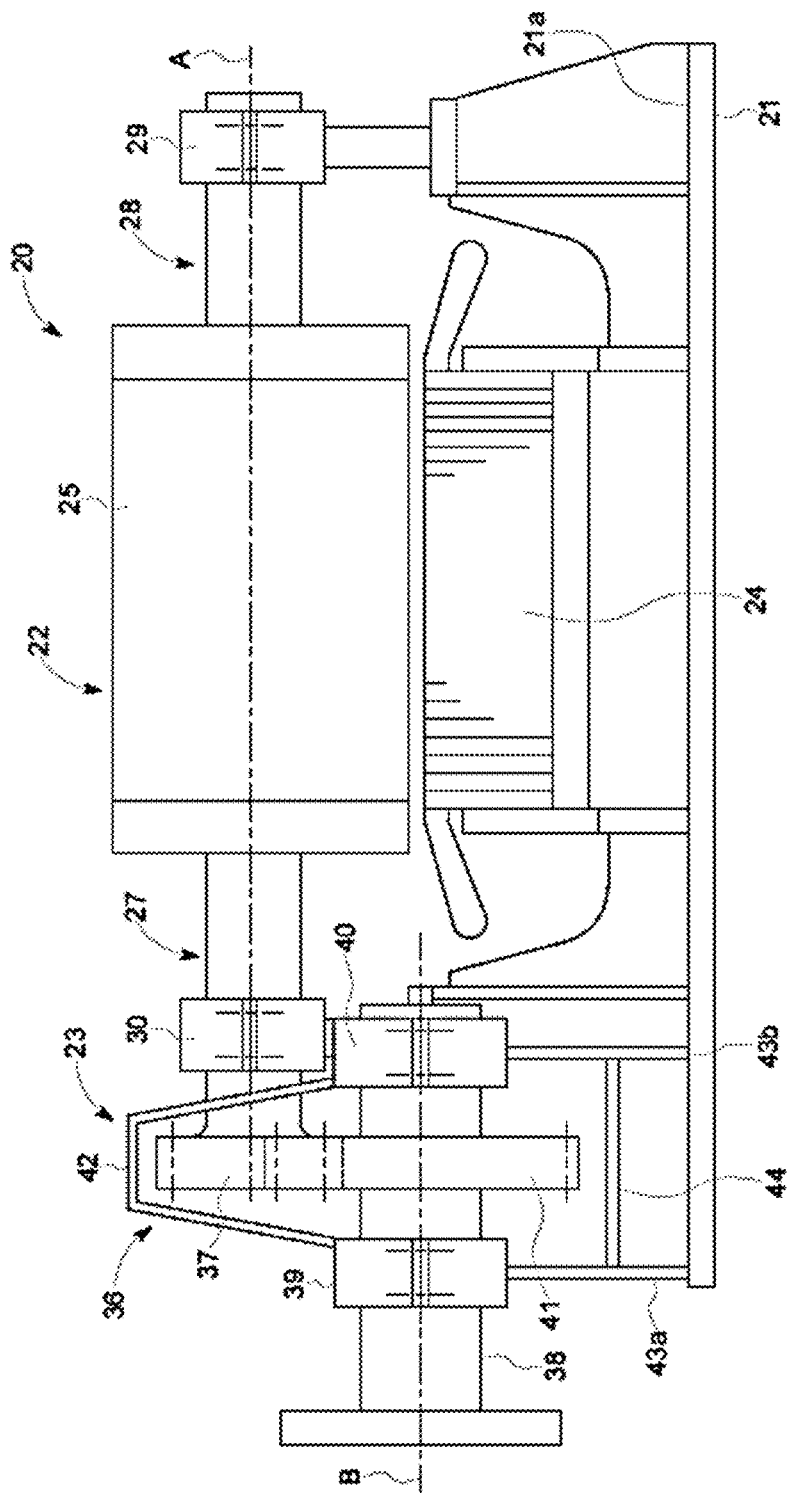
FIG. 5 shows a third embodiment of the mechanical drive system according to the invention.

In one embodiment, shown in FIG. 5 the casing 36 of the transfer case 23 may be formed by elements 42 43*a*, 43*b* and 44 of the frame 21 so that the transfer case 23 is integrated into the frame 21.

Since the casing 36 is integrated into the frame 21, the mass of the system 20 is even smaller.

Figure 6:
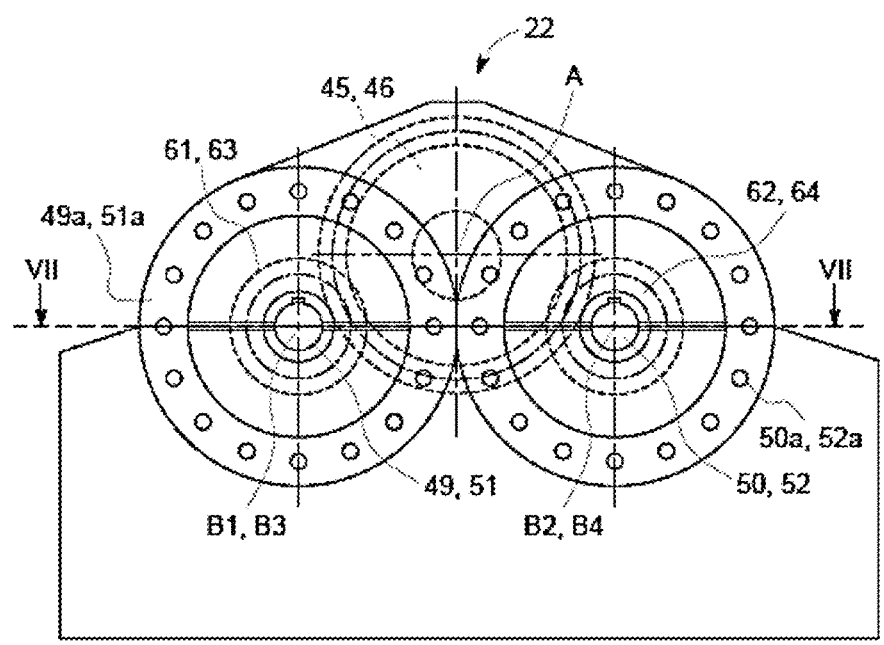
FIG. 6 and FIG. 7 show a side view and a partial section along a direction VII-VII of a fourth embodiment of the mechanical drive system according to the invention.
Figure 7:
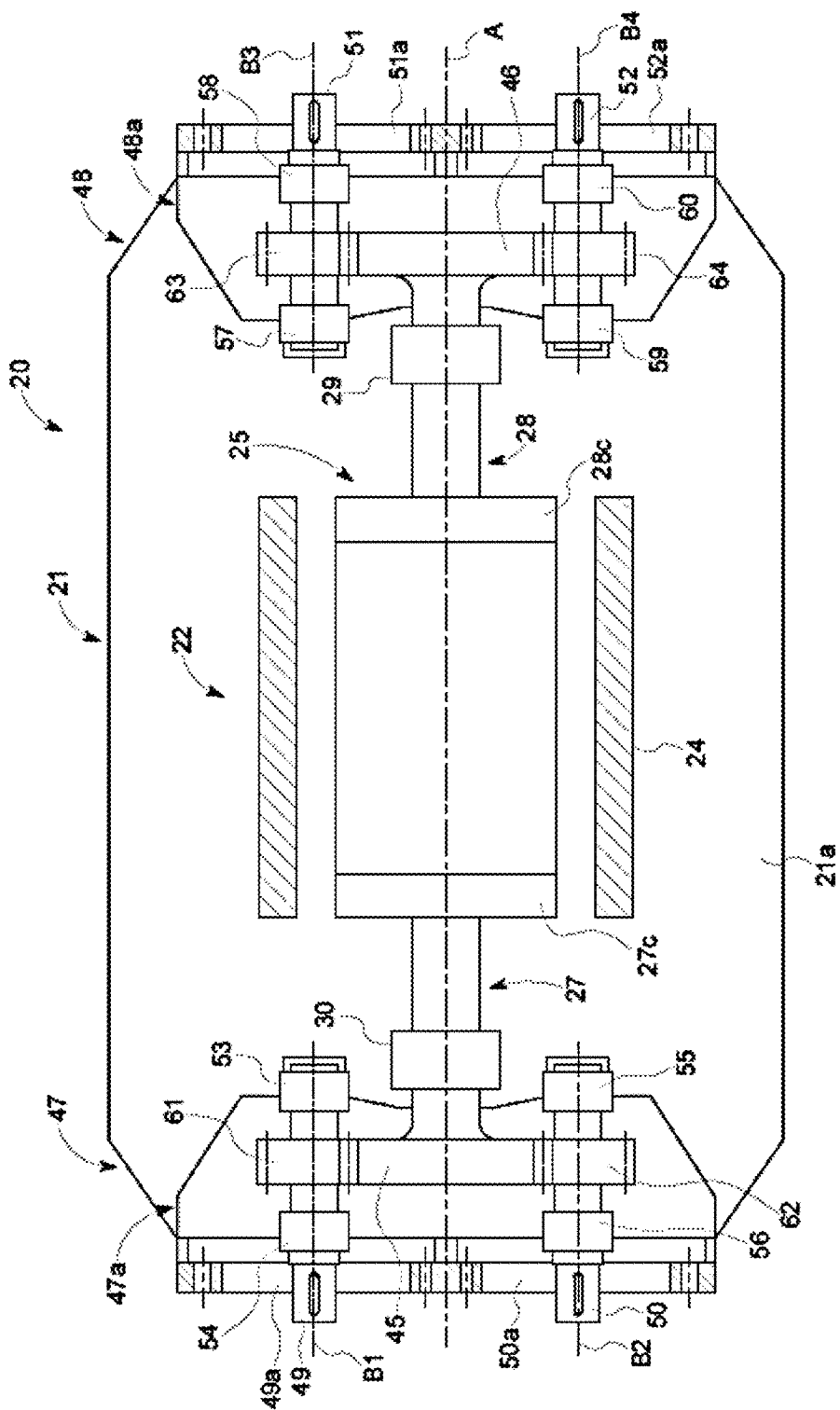

Reference is made to FIGS. 6 and 7 which show a side view and a partial section along a direction VII-VII of a fourth embodiment of the mechanical drive system 20 comprising the rotating electric machine 22 comprising the two half-shafts 27 and 28 supported in rotation by the bearings 29 and 30, the half-shafts 27 and 28 having at their free end a driving gear wheel 45 and 46.

Particular reference is made to FIG. 7.

The system 20 further comprises two transfer cases 47 and 48, preferably identical.

The rotating electric machine 22 and the transfer cases 47 and 48 are arranged on the base 21*a* of the frame 21.

Each transfer case 47, 48 comprises a casing 47*a*, 48*a* having the driving gear wheel 45, 46, two output shafts 49, 50, 51, 52 each comprising a central axis B1, B2, B3, B4 and being supported in rotation by bearings 53 to 60, and a driven gear wheel 61, 62, 63, 64 each integral with a different output shaft 49, 50, 51, 52 between two bearings 53 to 60, each driven gear wheel being meshed with a driving gear wheel 45 or 46.

The rotating electric machine 22 is dimensioned to drive four mechanical power consuming devices each connected to one of the output shafts 49, 50, 51, 52 via a fixing flange 49*a*, 50*a*, 51*a*, 52*a*.

Generally, the performance of an electric machine is better for a high-power machine.

As a result, the system 20 has a better overall performance than a system comprising two or four rotating electric machines each driving two or four mechanical power consuming devices for an identical consumed power.

Furthermore, the use of a single rotating electric machine makes it possible to reduce the overall bulk of the system 20.

Additionally, the weight of the rotor 25 acting on the bearings 29 and 30 is partially compensated by the components perpendicular to the base 21*a* of the forces coming from the gear wheels 61 to 64 in the inclined planes passing through the axes B1 and A, B2 and A, B3 and A, B4 and A.

As a variant, the transfer cases 47 and 48 are integrated into the frame 21. The elimination of the casings 47*a* and 48*a* makes it possible to reduce the mass of the system 20.

According to another variant, the system 20 comprises a single transfer case making it possible to drive two mechanical power consuming devices.

In the previous embodiments, the driving and driven gear wheels are spur gears so as to form parallel gears.

As a variant, the driving and driven gear wheels are conical so as to form concurrent gears, making it possible to further reduce the overall bulk of the system 20 along the axis A.

Figure 8:
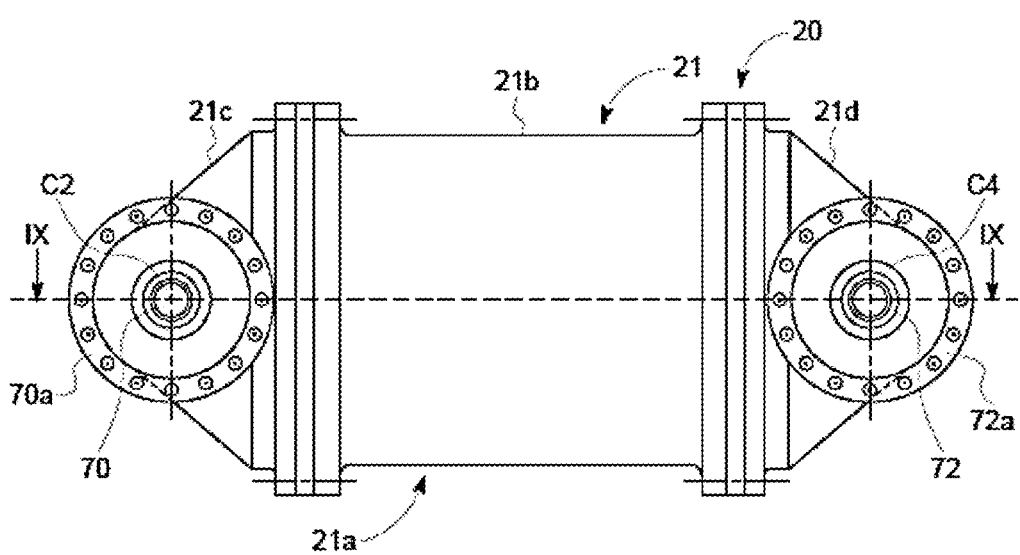
FIG. 8 and FIG. 9 show a view and a partial section along a direction IX-IX of a fifth embodiment of the mechanical drive system according to the invention.
Figure 9:
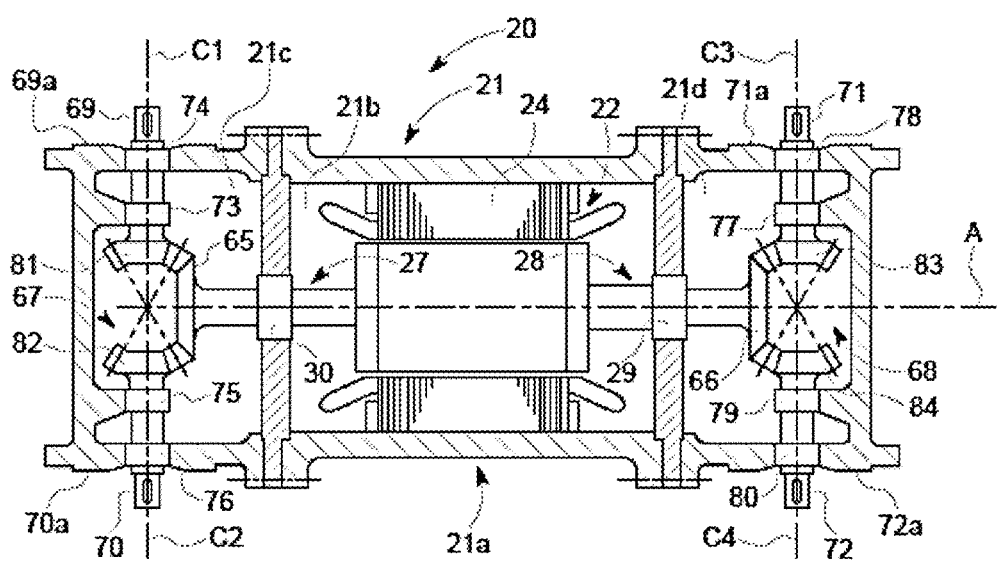

FIGS. 8 and 9 show a view and a partial section along a direction IX-IX of a fifth embodiment of the mechanical drive system 20 comprising the rotating electric machine 22 comprising the two half-shafts 27 and 28 supported in rotation by the bearings 29 and 30, the half-shafts 27 and 28 having at their end a driving gear wheel 65 and 66, and two transfer cases 67 and 68, preferably identical.

The frame 21 forms three chambers 21*b*, 21*c*, 21*d* arranged on its base 21*a*, the rotating electric machine 22 being arranged in the first chamber 21*b*, the first transfer case 67 and the second transfer case 68 being respectively arranged in the second and third chambers 21*c* and 21*d*.

Each chamber 21*b*, 21*c* and 21*d*, and the frame 21 are sealed.

Each transfer case 67 and 68 comprises the driving gear wheel 65, 66, two output shafts 69, 70, 71, 72 each one comprising a central axis C1, C2, C3, C4 and supported in rotation by bearings 73 to 80, and a driven bevel gear 81 to 84 each integral with an end of an output shaft 69, 70, 71, 72, each driven bevel gear being meshed with a driving bevel gear 65, 66 so as to form concurrent gears.

The rotation axis A of each driving bevel gear 65, 66 and the rotation axis C1 to C4 of each driven gear 81 to 84 are perpendicular or substantially perpendicular.

The configuration of the transfer cases 67 and 68 makes it possible to arrange mechanical power consuming devices perpendicularly to the rotation axis A of the rotating electric machine 22 in order to optimize the overall bulk of the system 20, particularly in terms of length along the axis A, and consuming devices connected to the output shafts 69 to 72.

The consuming devices are each connected to one of the output shafts 69, 70, 71, 72 by way of a fixing flange 69a, 70a, 71a, 72a.

According to another variant, the system 20 comprises a single transfer case making it possible to drive two mechanical power consuming devices.

As a variant, the bearings 30 and 29 supporting the half-shafts 27 and 28 and the output shafts 69 to 72 are equipped with seals so that the chambers 21b, 21c and 21d are sealed.

According to yet another variant, the bevel gears and the bearings of the transfer cases 67, 68 are incorporated in a casing formed by the frame 21 which does not comprise chambers and the rotating electric machine 22 is arranged on the base of the frame 21a.

According to yet another variant, the transfer cases 67, 68 each comprise a casing incorporating the bevel gears and the bearings, the rotating electric machine 22 and the transfer cases 67 and 68 being arranged on the base of the frame 21a.

Figure 10:
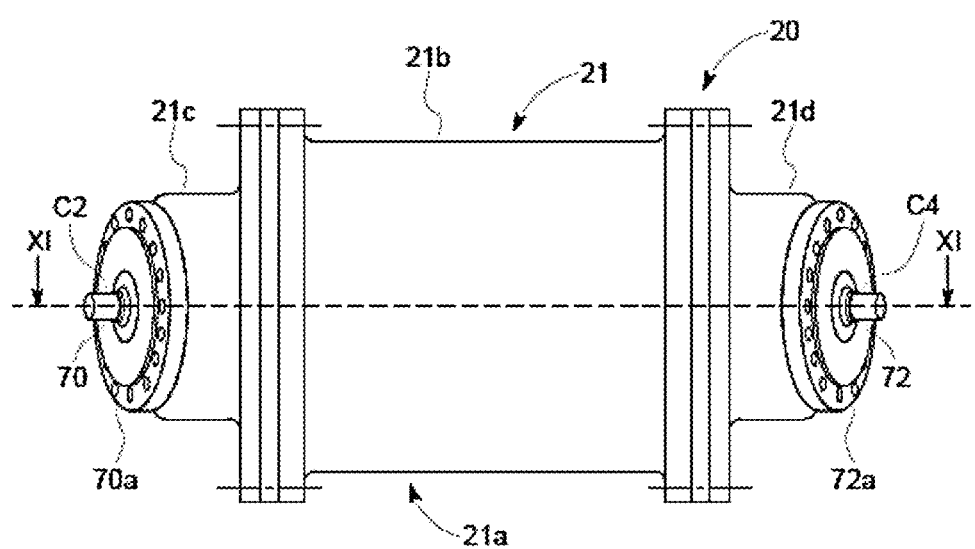
FIG. 10 and FIG. 11 show a view and a partial section along a direction XI-XI of a sixth embodiment of the mechanical drive system according to the invention.
Figure 11:
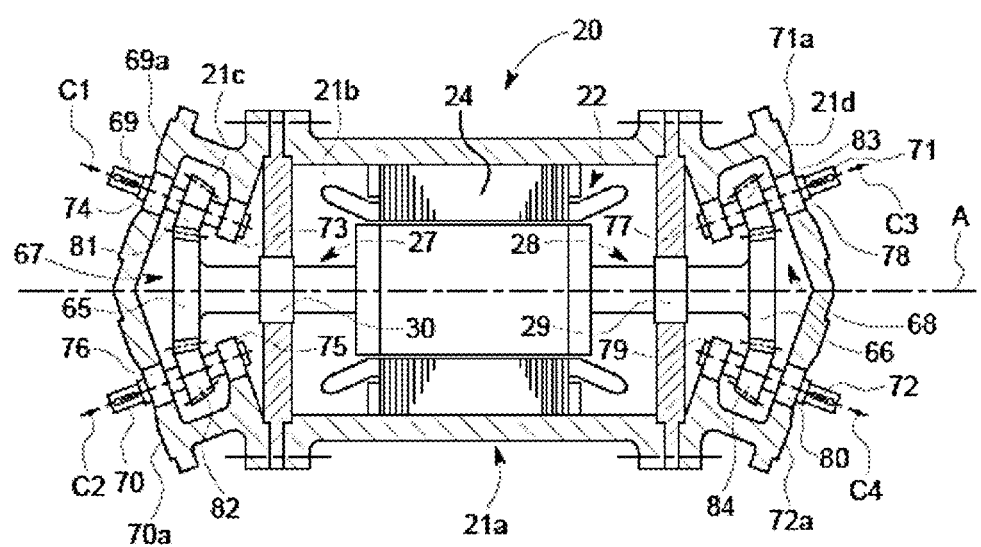

FIGS. 10 and 11 show a view and a partial section along a direction XI-XI of a sixth embodiment of the mechanical drive system 20.

This embodiment of the mechanical drive system 20 differs from the embodiment shown in FIGS. 8 and 9 in that the axis A of each driving bevel gear 65, 66 and the axes C1 to C4 of the driven bevel gears 81 to 84 form an angle between 5° and 45°, preferably between 10° and 30°.

The configuration of the transfer cases 67 and 68 makes it possible to arrange mechanical power consuming devices offset angularly with respect to the rotation axis A of the rotating electric machine 22 in order to optimize the overall bulk of the system 20 and of the consuming devices connected to the output shafts 69 to 72. The angle formed between the non-parallel axes C1 and C2, or C3 and C4, makes it possible to angularly separate the consuming devices in order to create a maintenance space around them. The consuming devices are connected via the fixing flanges 69a to 72a.

In the embodiments described above, each mechanical drive system 20 comprises a rotating electric machine 22.

According to other embodiments, the system 20 comprises a transfer case driven by two rotating electric machines.

Figure 12:
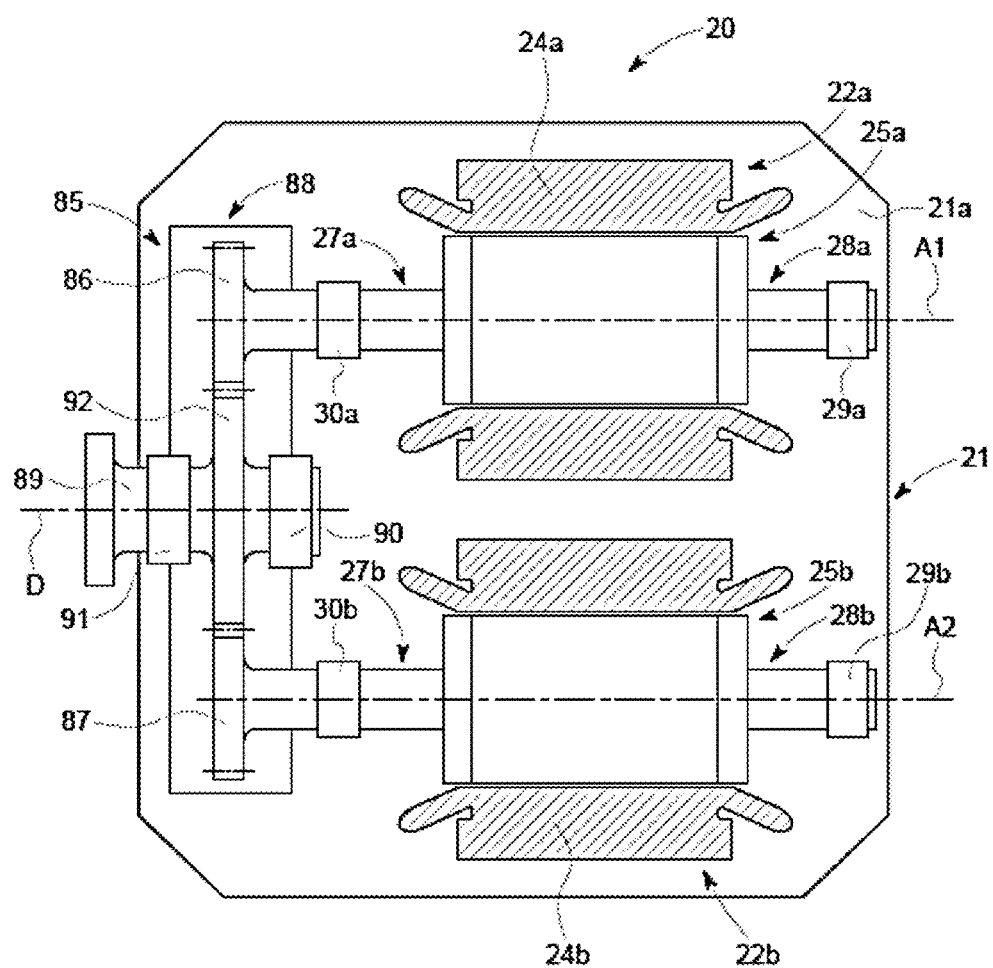
FIG. 12 shows a seventh embodiment of the mechanical drive system according to the invention.

FIG. 12 shows a partial section of a seventh embodiment of the mechanical drive system 20 comprising two rotating electric machines 22a and 22b identical to the rotating electric machine 22, and a transfer case 85 arranged on the base 21a of the frame 21.

The rotating electric machines 22a and 22b comprise a stator 24a, 24b, a rotor 25a, 25b with an end shaft of central axis A1, A2 and comprising two half-shafts 27a, 28a, 27b, 28b supported in rotation by bearings 29a, 30a, 29b, 30b.

The free end of the half-shaft 27a, 27b of the rotor 25a, 25b has a driving spur gear 86, 87.

The transfer case 85 has a casing 88 having the driving spur gears 86 and 87, an output shaft 89 comprising a central axis D and supported in rotation by bearings 90 and 91, and a driven spur gear 92 fixed between the two bearings 90 and 91 on the output shaft 89, the driving spur gears 86 and 87 being meshed with the driven spur gear 92.

The mechanical drive system 20 comprising two rotating electric machines 22a, 22b connected to the output shaft 89 makes it possible to drive a very high power consuming device which cannot be driven by a single rotating electric machine.

As a variant, the transfer case 85 is integrated into the frame 21. The elimination of the casing 88 makes it possible to reduce the mass of the system 20.

As a variant, the gear wheels are bevel gears creating an angle between the non-parallel axes A1 and A2, thus making it possible for example to reduce the lateral bulk of the transfer case 85, or to increase the space between the two stators 24a, 24b opposite from the transfer case 85.

According to yet another variant, the system 20 comprises a second transfer case similar to the first transfer case 85, the free ends of the half-shafts 28a, 28b of the rotors 25a, 25b being each one provided with a driving gear wheel driving an output shaft of the second transfer case.

According to yet another variant, as illustrated in FIG. 4, a first plane of the rotation axes of the driving gear wheel 86 and of the driven gear wheel 92 and a second plane of the rotation axes of the driving gear wheel 87 and of the driven gear wheel 92 respectively form an angle with the base 21a of the frame 21 of between 30° and 60°.

Two mechanical power consuming devices are driven by the system 20 reducing the bulk with respect to the use of two drive systems each driving a mechanical power consuming device.

Figure 13:
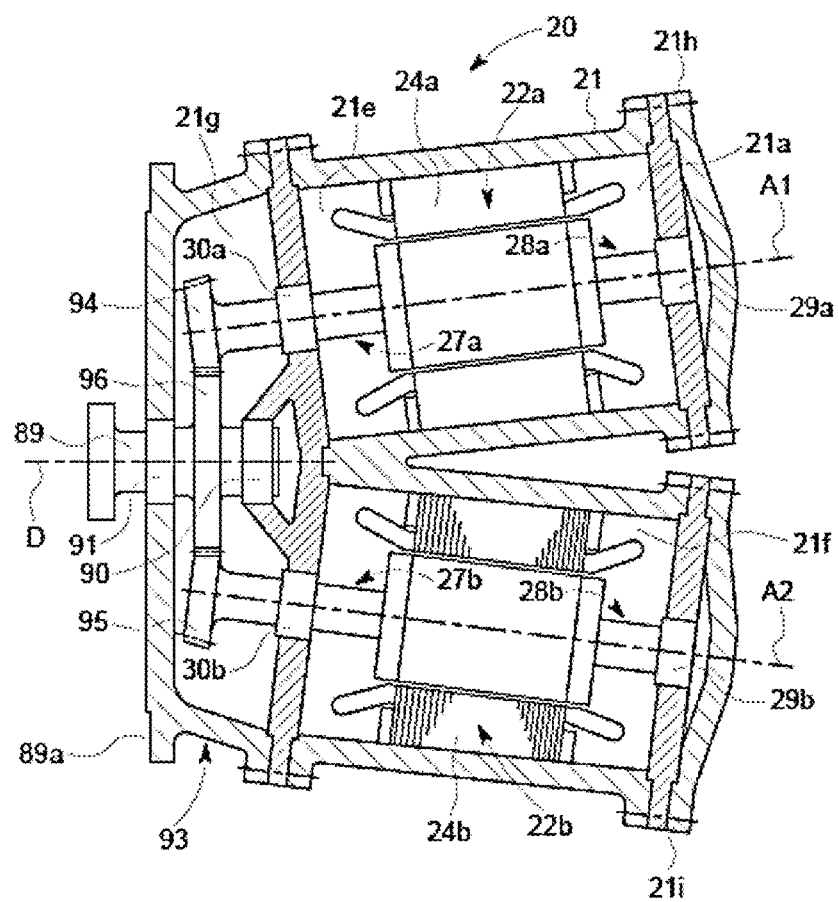
FIG. 13 shows an eighth embodiment of the mechanical drive system according to the invention.

FIG. 13 shows a partial section of an eighth embodiment of the mechanical drive system 20 comprising the rotating electric machines 22a and 22b comprising the half-shafts 27a, 28a, 27b, 28b supported in rotation by the bearings 29a, 30a, 29b, 30b and a transfer case 93 comprising the output shaft 89 supported in rotation by the bearings 90 and 91.

This embodiment of the system 20 differs from the embodiment shown in FIG. 12 in that the frame 21 forms three sealed chambers 21e, 21f, 21g arranged on its base 21a, the rotating electric machines 22a being arranged respectively in a first chamber 21e and a second chamber 21f, and the transfer case 93 being arranged in a third chamber 21g, and differs in that the transfer case 93 comprises two driving bevel gears 94 and 95 connected to the free ends of the half-shafts 27a and 27b, the two driving bevel gears 94 and 95 being meshed with a driven bevel gear 96 on the output shaft 89 arranged between the two bearings 90 and 91.

The axes A1 and A2 are inclined by an angle of between 5° and 45°, preferably between 10° and 30° with the axis of the driven gear wheel 96.

The first chamber 21e and the second chamber 21f comprise sealed covers 21h and 21i for sealing the bearings 29a and 29b. The frame 21 comprising the three chambers 21e, 21f, 21g is sealed. The third chamber 21g comprises a fixing flange 89a so as to drive a mechanical power consuming device fixed to the flange 89a.

As a variant, the transfer case 93 comprises spur gears so as to form parallel gears, the axes A1, A2 of the rotors 25a, 25b being parallel.

Figure 14:
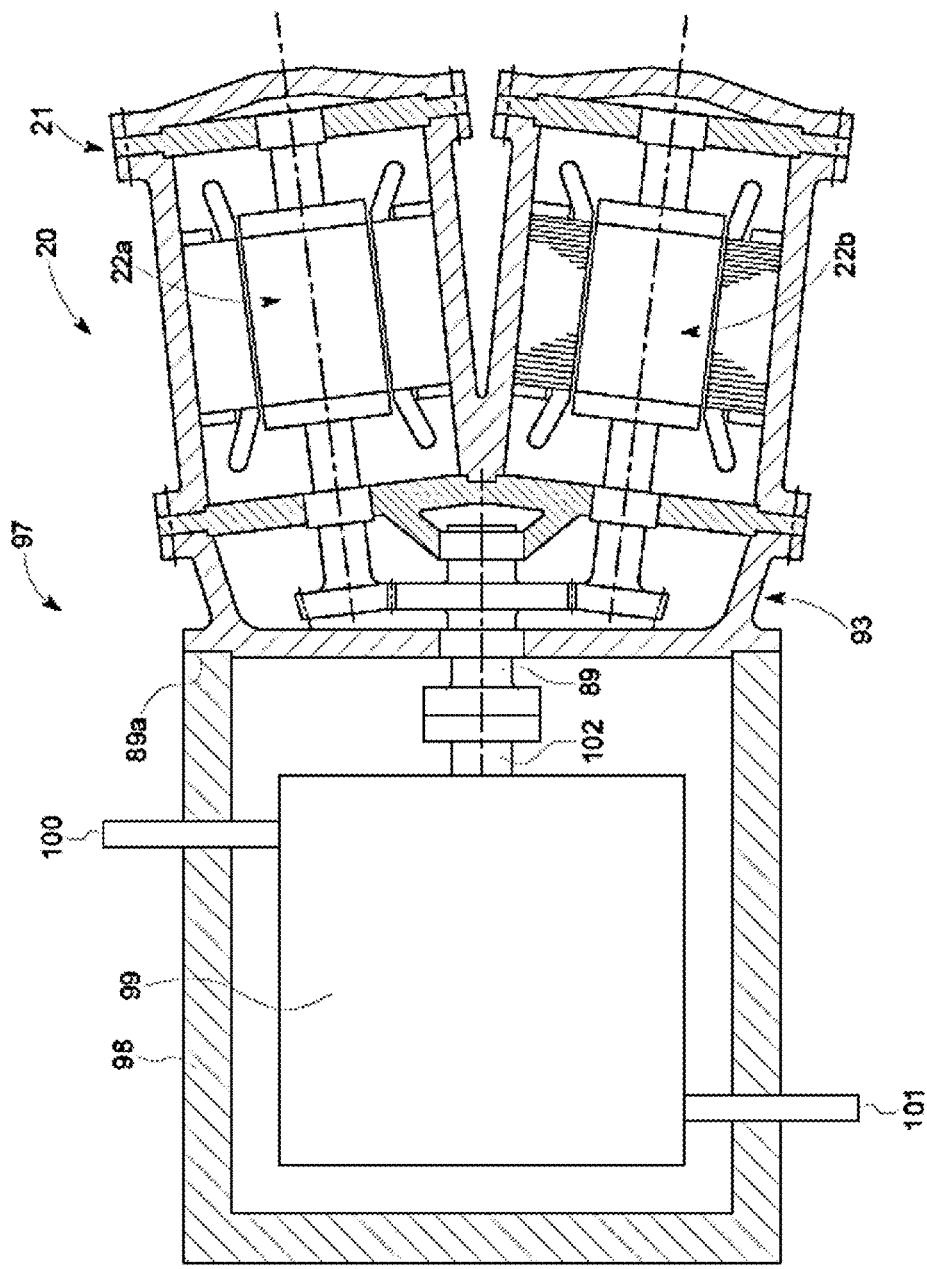
FIG. 14 shows an embodiment of a motor compressor according to the invention.

FIG. 14 shows a motor compressor 97 comprising the mechanical drive system 20 as shown in FIG. 13, a sealed case 98 fixed to the frame 21, the case 98 comprising a compression section 99 comprising an inlet 100 and an outlet 101.

The case 98 and the frame 21 are fixed together via the fixing flange 89a and form a sealed assembly. The rotating electric machines 22a, 22b and the compression section 99 are subjected to an internal pressure of for example 40 bar to 150 bar.

The compression section 99 further comprises an input shaft 102 connected to the output shaft 89 of the transfer case 93 so that compressor gears incorporated in the section 99 are driven by the rotating electric machines 22a and 22b so as to compress for example a gas at the inlet 100.

The mechanical drive system 20 comprising two rotating electric machines 22a, 22b makes it possible to drive a very high power compression section 99 which could not be driven by a single rotating electric machine.

The embodiments of the mechanical drive systems previously disclosed have a reduced mass and a reduced overall bulk compared with the known systems of the state of the art.

Additionally, the embodiments of the disclosed mechanical drive systems make it possible to transmit a greater torque and/or rotational speed and improve overall efficiency of said systems.

Additionally, the disclosed embodiments allow the configuration of the systems to be adjusted to the number of consuming devices and the available bulk.

The embodiments of the system 20 disclosed in FIGS. 8, 9, 10, 11 and 13 are particularly suitable for use in the motor compressor 97. The frame 21, comprising a plurality of sealed chambers and fixed to one or more compression sections, forms a motor compressor assembly impervious to the internal pressure coming from the compressor gears making it possible to reduce the leakage for example of gas to the surrounding atmosphere in comparison with a rotating electric machine and a compression section separated by a coupling shaft having leakages for example of gas at the seals of the input shaft of the compressor.

In the embodiments previously disclosed, the rotating electric machines operate in motor mode.

Of course, the rotating electric machines can operate in generator mode to produce electrical power.

In this mode of operation, the system 20 is driven by a mechanical power producing device, such as for example a gas turbine or a steam turbine. The at least one driven gear wheel drives the at least one driving gear so as to drive the at least one rotating electric machine.

The invention claimed is:

1. A mechanical drive system comprising a frame, at least one rotating electric machine comprising:
    an end shaft rotor without a through-shaft arranged on the frame; and
    at least one transfer case having at least one driving gear wheel, wherein the at least one rotating electric machine and the at least one transfer case are both located on the frame and the driving gear wheel is integral with the end shaft rotor of the rotating electric machine, wherein the at least one transfer case being arranged on the frame comprises a casing formed by frame elements so that the at least one transfer case is integrated into the frame, and at least one driven gear wheel being connected to an output shaft of the at least one transfer case, the at least one driven gear wheel being meshed with the driving gear wheel, a plane of the rotation axes of the at least one driving gear wheel and of the at least one driven gear wheel forms an angle with the base of the frame of between 30° and 60°.

2. The mechanical drive system according to claim 1, wherein the end shaft rotor has a cylindrical magnetic block enclosed between two half-shafts, the half-shafts forming the end rotor shaft.

3. The mechanical drive system according to claim 2, in which the half-shaft and the drive gear wheel are made in one piece.

4. The mechanical drive system according to claim 1, wherein the at least one transfer case further comprises at least two driven gear wheels each one connected to an output shaft of the at least one transfer case, each of the driven gear wheels being meshed with the driving gear wheel.

5. The mechanical drive system according to claim 1, further comprising a second transfer case arranged on the base of the frame, a second end of the end rotor shaft having a driving gear wheel of the second transfer case.

6. The mechanical drive system according to claim 2, further having a second rotating electric machine comprising an end shaft rotor arranged on a base of the frame, at least one end of a rotor shaft of the second rotating electric machine having a second driving gear wheel of the at least one transfer case.

7. The mechanical drive system according to claim 6, wherein the at least one transfer case further comprises at least one driven gear wheel connected to an output shaft of the at least one transfer case, the driven gear wheel being meshed with the driving gear wheels, a first plane of the rotation axes of the driving gear wheel and of the driven gear wheel, and a second plane of the rotation axes of the second driving gear wheel and of the driven gear wheel form respectively an angle with the base of the frame of between 30° and 60°.

8. The mechanical drive system according to claim 7, comprising a second transfer case similar to the at least one transfer case, the free ends of the half-shafts of the end shaft rotor of each rotating electric machine being provided with a driving gear wheel driving an output shaft of the second transfer case.

9. The mechanical drive system according to claim 8, wherein the gear wheels are spur gears so as to form parallel gears.

10. The mechanical drive system according to claim 8, wherein the gear wheels are bevel gears so as to form concurrent gears.

11. The mechanical drive system according to claim 10, wherein a rotation axis of each driving gear wheel and a rotation axis of each driven gear are substantially perpendicular.

12. The mechanical drive system according to claim 10, wherein a rotation axis of each driving gear wheel and a rotation axis of each driven gear wheel form an angle of between 5° and 45°, preferably between 10° and 30°.

13. The mechanical drive system according to claim 8, wherein each-rotating electric machine and each transfer case are arranged in a different sealed chamber formed by the frame.

14. The mechanical drive system according to claim 1, wherein the rotating electric machine is of a squirrel-cage asynchronous type.

15. A motor compressor comprising a mechanical drive system according to claim 1, driving a compression section of the motor compressor.

* * * * *